US 7,065,037 B1

(12) United States Patent
Viswanathan et al.

(10) Patent No.: US 7,065,037 B1
(45) Date of Patent: Jun. 20, 2006

(54) METHOD AND APPARATUS TO PROVIDE FACILITY AND MODULE REDUNDANCY IN TELECOMMUNICATION SWITCHING EQUIPMENT

(75) Inventors: Senthil K. Viswanathan, San Diego, CA (US); Robert W. Cubbage, Allen, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/276,346

(22) Filed: Mar. 25, 1999

(51) Int. Cl.
*G01R 31/08* (2006.01)
*G06F 11/00* (2006.01)
*H04J 1/16* (2006.01)
*H04L 1/00* (2006.01)
*H04L 12/26* (2006.01)

(52) U.S. Cl. ............ 370/217; 370/218; 370/219; 370/220; 370/227; 370/228

(58) Field of Classification Search ............ 370/225, 370/226, 227, 228, 229, 230, 235, 395.1, 370/218, 219, 217, 395.32, 220, 221, 235.1, 370/395, 232
See application file for complete search history.

(56) References Cited

U.S. PATENT DOCUMENTS 5,166,926 A * 11/1992 Cisneros et al. ............ 370/392
5,398,236 A * 3/1995 Hemmady et al. .......... 370/218
5,436,886 A * 7/1995 McGill ....................... 370/219
5,459,606 A * 10/1995 Baranyai et al. ............. 398/56
5,715,237 A * 2/1998 Akiyoshi .................... 370/228
5,903,544 A * 5/1999 Sakamoto et al. .......... 370/218
5,959,972 A * 9/1999 Hamami ..................... 370/228
6,075,767 A * 6/2000 Sakamoto et al. .......... 370/228
6,137,790 A * 10/2000 Bordogna et al. .......... 370/351
6,327,244 B1* 12/2001 Sakamoto et al. .......... 370/218
6,466,576 B1* 10/2002 Sekine et al. ............... 370/217
6,560,202 B1* 5/2003 Bordogna et al. .......... 370/248

FOREIGN PATENT DOCUMENTS

JP          8-251184        9/1996

* cited by examiner

*Primary Examiner*—Ajit Patel
*Assistant Examiner*—Chuong Ho

(57) ABSTRACT

A cross point switch is configured to select from one of a first stream of ATM cells and a second stream of ATM cells, the first stream and the second stream being identical, and is further configured to select and substitute the second stream for the first stream upon detection of an error condition in the working circuitry operation on the first stream. The working circuitry, which is located on an interface module, is configured to receive and operate on the first stream of ATM cells. The protection circuitry, which is located on a redundant interface module, is configured to receive and operate on the second stream of cells. The protection circuitry and the working circuitry are functionally identical and synchronized to each other so that switching occurs from one stream to the other without interruption of network service.

16 Claims, 6 Drawing Sheets

METHOD AND APPARATUS TO PROVIDE FACILITY AND MODULE REDUNDANCY IN TELECOMMUNICATION SWITCHING EQUIPMENT

BACKGROUND OF THE INVENTION

1. Field of the Invention

The present invention relates generally to communication networks, and more specifically, to ATM (Asynchronous Transfer Mode) equipment having module redundancy for protecting network connections from failure.

2. Description of Related Art

ATM (Asynchronous Transfer Mode) high-speed switched networks have been proposed as a technology capable of integrating present digital services with new multimedia services, e.g., video on demand, live television from many sources, CD-quality music, LAN interconnection, and high-speed data transport for science and industry. To implement these different services, ATM networks are designed to handle a variety of traffic characteristics, e.g., constant rate, variable rate, and bursty, required for various real time, such as video conferencing, and non-real time, such as E-mail and web browsing, applications. The basic principles of ATM networks are well known to those skilled in the art and are discussed in numerous published references (see, for example, Andrew S. Tanenbaum, Computer Networks, Prentice Hall, 1996, 3rd ed.).

ATM switches transfer data using a cell switching technology. All data in an ATM network is transmitted between the switches of the network in small, fixed size 53 byte long ATM cells having 5 bytes for a header and 48 bytes for the information or data payload. The header of each cell contains a virtual connection identifier used for routing the cells over the network. Each ATM cell contains a two-part connection identifier in the cell header: a Virtual Path Identifier (VPI) and a Virtual Circuit Identifier (VCI). This two-part connection identifier uniquely identifies an ATM virtual connection on a physical interface.

ATM is a connection-oriented technology. That is, a call is required by user A to user B, similar to a telephone call, to set up a connection between the two users. Once the connection path is established, all data cells are transferred over the same connection path. This guarantees that cells will be delivered in order. Although ATM establishes a circuit between hosts, it establishes this circuit internally using cell switching technology. When a virtual circuit is established between hosts, what really happens is that table entries storing routing information are made in each switch along the path between the hosts.

The following is an example of what happens when a user A connects to a user B. First, user A sends a call request to user B. The call request arrives at an ingress switch of the ATM network. Call control software located at the ingress switch uses NNI signaling procedures combined with NNI routing services to locate user B and establish a virtual connection over which user A and user B exchange data.

Once a connection is established, data can be exchanged between User A and User B. Typically, the flow of data proceeds as follows. User A opens an application on the computer of User A which sends data to User B. Network software at User A's side will receive the data from the application of user A, and arrange the data into packets. Each packet is arranged as a variable length sequence of 53 byte ATM cells carrying the data payload preceded by a packet header cell containing information related to the application. The packets are sent over the ATM network cell by cell from User A to User B. The cells are reassembled into packets by software at User B's end and presented to User B as an application packet.

ATM networks provide several mechanisms for assuring quality of service and regulating traffic flow and congestion. Traffic shaping and traffic congestion control have been proposed for ATM networks. In traffic shaping, a quality of services contract is formed before data transmission between the customer and the network where the required transmission parameters are specified. For example, a customer could specify a requirement that data be transferred with a delay of 10 microseconds. In turn, the customer is required to abide by conditions of the contract, e.g., to transmit below an agreed upon rate. Traffic policing functions, e.g., user parameter control (UPC) within the ATM network enforce the user's agreement to the terms in the contract.

The physical layer connection of ATM networks normally consists of optical fibers working on the SONET (Synchronous Optical Network) standard. A SONET system consists of transport network elements such as add/drop multiplexers (ADMs), multiplexers, and repeaters all connected by optical fiber. An ATM switch in a SONET network may have one or more SONET interface unit boards which extract ATM cells from the optical signals of the fiber pathways to allow the ATM processing and routing functions to be applied by the ATM switch.

In ATM networks, the reliability of the ATM switch is critical because malfunctioning ATM equipment may result in the failure of an individual permanent virtual circuit (PVC) and a switched virtual circuit (SVC) connections. Malfunctions of the ATM equipment are generally classified into two types of failures: facilities failure and equipment failure. A facility failure refers broadly to the failure of anything external to the equipment such as a failure of one of the cables coming into the equipment, e.g., a fiber cut, or even connector problems. Someone could unplug a connector on the front of the equipment and that would be classified as a facility failure. An equipment failure includes any failure occurring within the electronics of the equipment itself (e.g. electronic failure).

It would be highly desirable to provide protection for ATM equipment or other communication switching equipment in order to preserve network reliability despite the above stated facility and equipment failures.

SUMMARY OF THE INVENTION

In order to overcome the above-stated problems, the present invention includes working circuitry configured to receive a first stream of cells and protection circuitry configured to receive a second stream of cells. Typically, the cells are ATM cells. The second stream is identical to the first stream. The protection circuitry and the working circuitry are functionally identical and synchronized to each other. A cross point switch is configured to select a first stream and is further configured to select and substitute a second stream for the first stream upon detection of an error condition in the working circuitry of the first stream.

The error condition may be a facility error condition (e.g., a disconnected cable) or an equipment error condition. An equipment error condition is a failure which occurs internal to equipment (e.g., the SONET Framer, the multiplexer, the user parameter control unit, the router, and the failure of other circuitry associated with the working circuitry and protection circuitry).

In a further aspect of the present invention, the working circuitry receives the first stream from an optical signal and the protection circuitry receives the second stream from the same optical signal.

In another aspect of the present invention, the working circuitry is implemented on a first board and the protection circuitry is implemented on a second board, the first board being separate and distinct from the second board.

In yet another aspect of the present invention, the working circuitry includes a plurality of ATM units performing ATM functions on the first stream and the protection circuitry includes a plurality of identical ATM units performing the same ATM functions on the second stream. One of the ATM units may be a multiplexer, a SONET framer, a router, a user parameter control unit, and a signaling unit.

In yet another aspect of the present invention, a first module has a plurality of ports wherein one or more of the ports accepts their stream as input to the working circuitry and the remaining ports may accept their stream as input to the protection circuitry.

In still another aspect of the present invention, a second module includes the protection circuitry and has a plurality of ports wherein one of the ports accepts the second stream as input into the protection circuitry and the remaining ports may accept their stream as input to the working circuitry.

In a further aspect of the present invention, an ATM switch fabric has a plurality of input ports, a plurality of output ports, and is configured to transfer an ATM cell received from a cell stream of one of the input ports to any one of the output ports.

In still another aspect of the present invention, input ports of the ATM switch fabric receives the ATM cells from a cell stream, either the first stream or the second stream as selected by the cross point switch.

In another aspect of the present invention, a second cross point switch is configured to receive ATM cells from one of the output ports of the ATM switch fabric and directs the ATM cells to a third stream and further directs the ATM cells to a fourth stream.

In still another aspect of the present invention, a second working circuitry is configured to receive the third stream of cells from the second cross point switch. Furthermore, a second protection circuitry is configured to receive the fourth stream of cells from the second cross point switch. The third stream is identical to the fourth stream. The second protection circuitry and the second working circuitry are functionally identical and synchronized to each other.

DETAILED DESCRIPTION OF THE INVENTION

Figure 1:
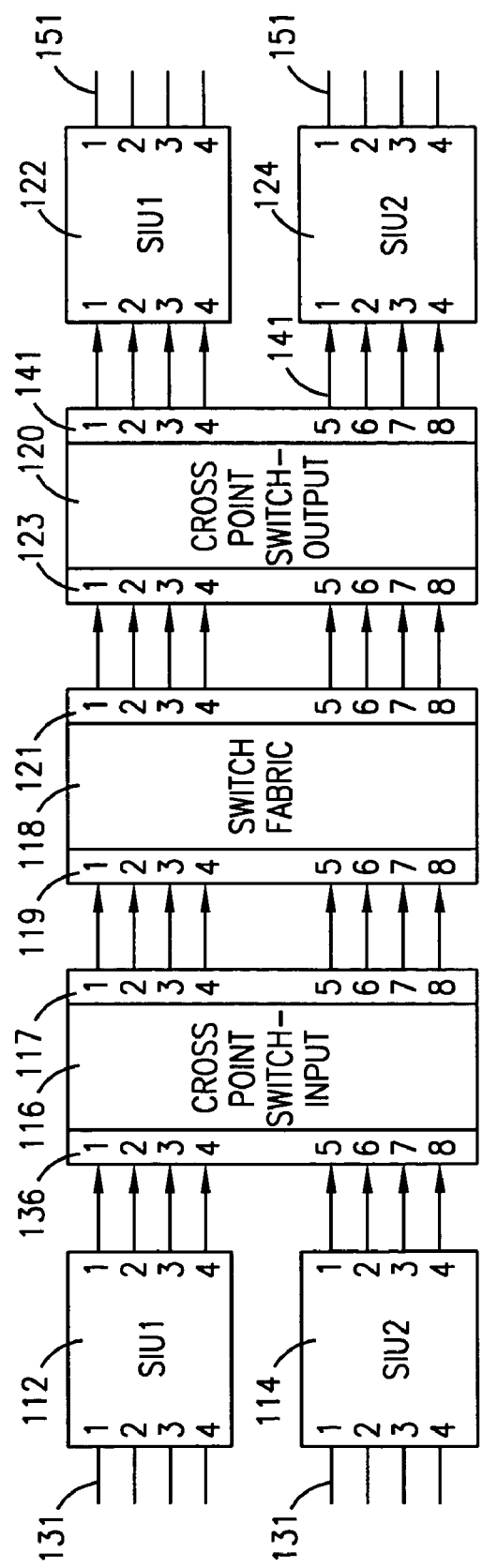
FIG. 1 is a system diagram showing an exemplary ATM switch architecture using cross point switches to provide protection against failures according to the present invention.

FIG. 1 shows a preferred embodiment of an architecture 100 of the present invention for protecting an ATM switching fabric 118 from facility and equipment malfunction. However, it should be understand that other embodiments of the present invention may be applied to switching fabrics other than ATM. The present invention provides protection on the order of 50 milliseconds for each individual permanent virtual circuit (PVC) and switched virtual circuit (SVC) of the ATM network. In brief, the manner in which this is accomplished is by using 1+1 APS (Automatic Protection Switching) to provide identical information to two separate modules. In the event of a failure, the protection module will become active and provide service. The protection module is made active to the switch fabric by using cross point switches.

FIG. 1 shows the architecture 100 having four SONET (Synchronous Optical Network) interface modules (SIU) 112, 114, 122, 124. The cross point switches 116 and 120 interface these four SIU modules to switch fabric 118. In the preferred embodiment, the circuitry of modules 112 and 122 are implemented on the same circuit board as transceiver pairs and similarly the circuitry of redundant modules 114 and 124 are implemented on the same circuit board as transceiver pairs. However, FIG. 1 depicts the modules 112, 114, 122 and 124 functionally and thus the present invention is not limited to any particular correspondence between modules 112, 114, 122, 124 and circuit board hardware. Thus, other configurations are possible. In addition, the circuitry of the modules 112, 114, 122 and 124 are bidirectional. Thus, even though data will be described herein as being input into modules 112, and 114 flowing though the system and output through modules 122 and 124, it should be noted that data may also flow in the opposite direction by being input to modules 122 and 124, and flowing through the system and output through modules 112 and 114.

Figure 2:
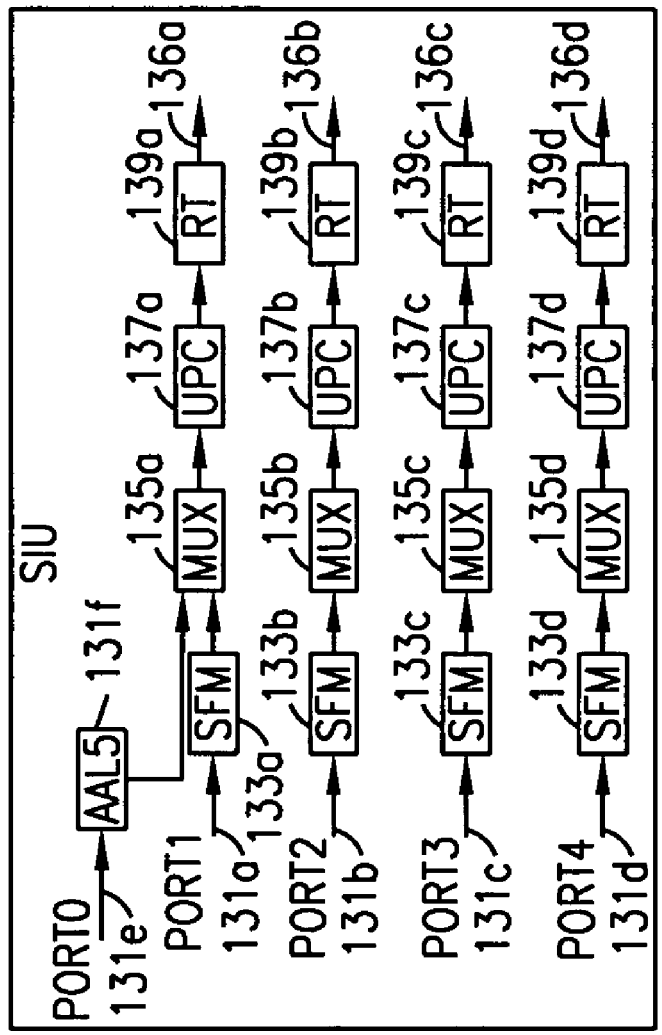
FIG. 2 is a block diagram of an exemplary SONET Interface unit for operating on input ATM cell streams.

FIG. 2 shows the preferred embodiment of SIU module 112 receiving streams 131a–d of SONET frames on ports 1–4. Redundant module 114 works identically to module 112. In the preferred embodiment, streams 131a–d are composed of SONET frames. A SONET frame is made up of frame overhead information and a payload consisting of a series of ATM cells. This process of supporting an asynchronous ATM layer using a synchronous SONET carrier is well-known in the telecommunications art.

SONET deframers 133a–d extract the ATM payloads from the SONET frames of streams 131a–131d. The payload extracted from each SONET frame is a stream of ATM cells.

On port 0 only, the SIU module 112 contains an AAL5 (ATM adaption layer 5) unit 131f receiving an ATM electrical signal (non optical) 131e on port 0 from the ATM network. AAL5 unit 131f performs the signaling function by setting up and breaking down calls for the ATM network. In the embodiment of the present invention, there is one signaling function unit to serve four ports of each module. Future revisions or variations of the SIU modules are not necessarily constrained to this configuration. Multiplexer unit 135a combines the ATM signal from the output of AAL5 131f with the stream of ATM cells output from the SFM 133a.

Multiplexer units 135a–135d pass the data flow received from the SONET deframers (SFM units) 133a–133d and AAL5 131f to the Parametric Control (UPC) units 137a–d which monitor the ATM cells streams received from units 135a–135d to enforce customer contracts and perform other policing functions well-known in the ATM network art.

The routers 139a–d route the ATM cells received from UPC units 137a–137d from the input ports 119 of switch fabric 118 to the appropriate output ports 121 of switch fabric 118 (see FIG. 1). Each ATM cell has a header and a payload carrying information bits. The header of the ATM cell indicates a virtual address from which the router determines where to route the ATM cell. For example, an ATM cell input to port 1 of the ATM switch fabric 118 will be routed to one of switch fabric output ports 1–8 depending on the header. The router will place an internal code in the ATM cell for routing the cell through the switch fabric 118.

Figure 3:
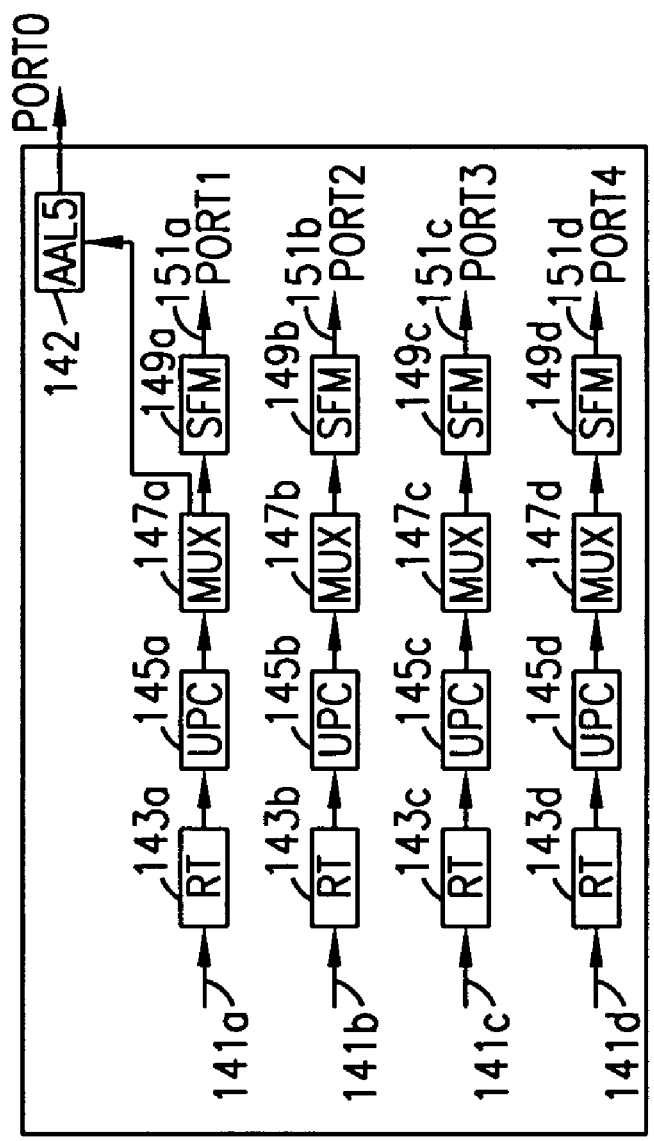
FIG. 3 is a block diagram of an exemplary SONET Interface unit for operating on output ATM cell streams.

FIG. 3 shows SIU module 122 operating on ATM cell streams 141a–d received from crosspoint switch 120 output ports 1–4 (in the default case where ports 1–4 are the working ports). Routers 143a–143d may perform operations on ATM cells streams 141a–d to prepare them for routing to the external network. Then UPC units 145a–145d may perform traffic shaping or other operations on the cell stream output from routers 143a–143d. The multiplexers 147a–147d pass the data through from UPC units 145a–145d. In port 0, demultiplexer 147a separates the call signal data from the ATM data stream to signaling unit 142. SFM modules 149a–149d create SONET frames for transporting the ATM cells received from MUX 147a–147d. In addition, it should be noted that modules 122 and 124 are bidirectional and therefore router units (RT) 143a–143d, UPC 145a–145d, MUX 147a–147d, SFM 149a–149d, and AAL5 unit 142 of modules 122, 124 perform the same functions described above for the units of modules 112, 114 when ATM signal streams 151a–151d are received on ports 1–4.

SIU module 114 is a redundant module having identical circuitry to SIU 112. Similarly, SIU module 124 is a redundant module containing identical circuitry to SIU module 122. The interface modules 112 and 122 are designated as the active modules. The interface modules 114 and 124 are designated as the standby modules. At any given time, a port of one of the modules can be configured to be either a working port or a protected port. The working port is actively processing input data while the protected port remains inactive. To clarify this, for example, either port 1 of SIU module 112 or port 1 of module 114 will be the working port and the other port will be the protected port. Similarly port 2 of SIU module 112 can be the working port while port 2 of SIU module 114 is the protected port or vis-a-vis. In the present exemplary embodiment all the ports of the active SIU module 112 are initially chosen as the working ports and all the ports of the SIU module 114 are protected ports. Referring again to FIG. 1, the switching fabric 118 is capable of routing an ATM cell from any one of the 8 input ports 119 to any one of the 8 output ports 121 (8 ports are shown in FIG. 1 for simplification). The ATM switch, in general, may have an arbitrary number of inputs (N), that is, it could be an N×N matrix. Preferably, there are 16 input and output ports.

There are two cross-point switches 116, 120, the cross point switch 116 on the input stage of the switch fabric 118 and the cross-point switch 120 on the output stage of the switch fabric 118. The cross point switch 116 having input ports and output ports connects any of its input ports 136 to any of its output ports 117. The cross point switch 120 connects any of its input ports 123 to any of its output ports 141.

Figure 4:
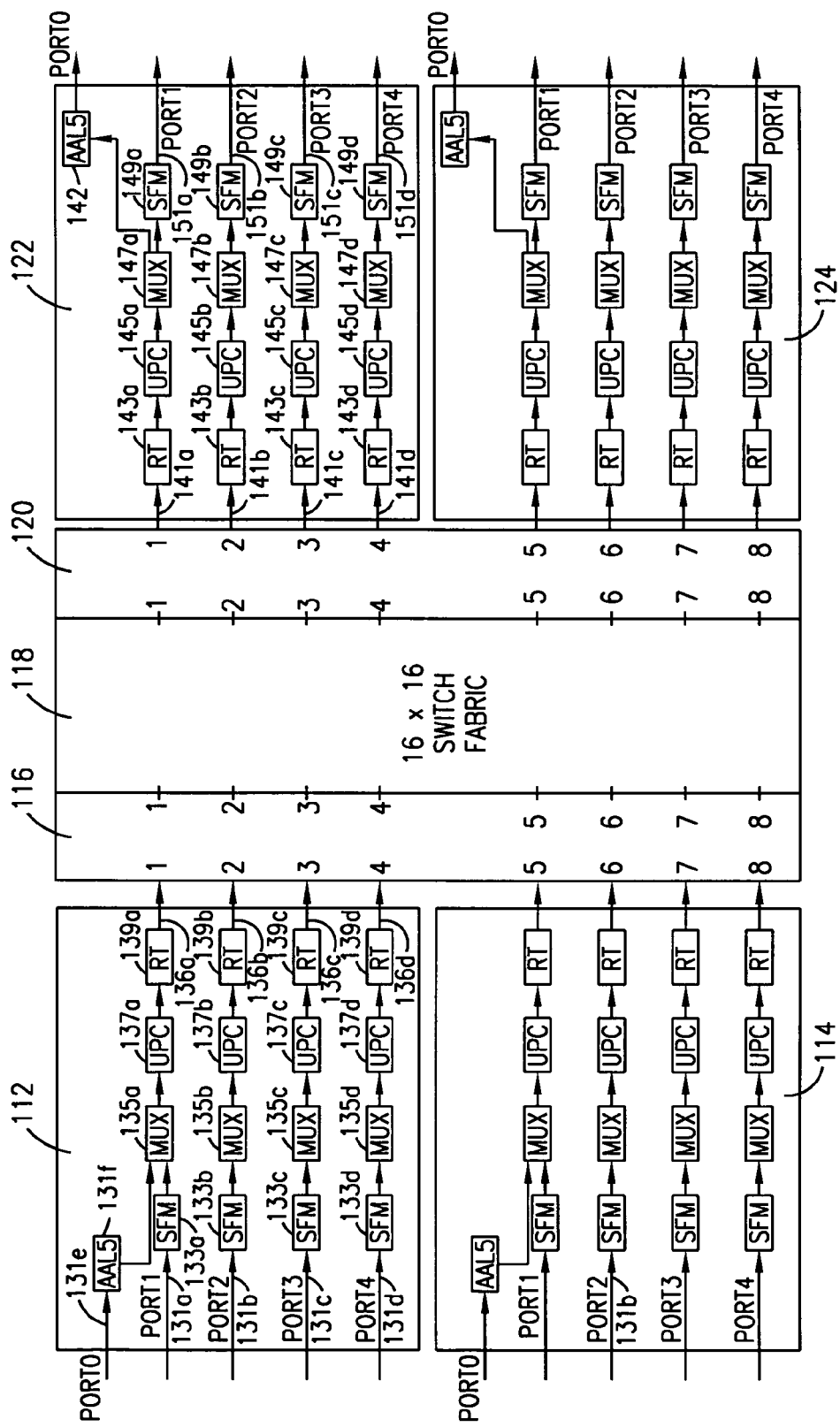
FIG. 4 is an exemplary system diagram of an ATM switch architecture according to the present invention.

FIG. 4 illustrates the basic architecture 100 of the present invention in more detail than FIG. 1 by including the circuitry of the SIU modules shown in FIGS. 2 and 3.

Figure 5:
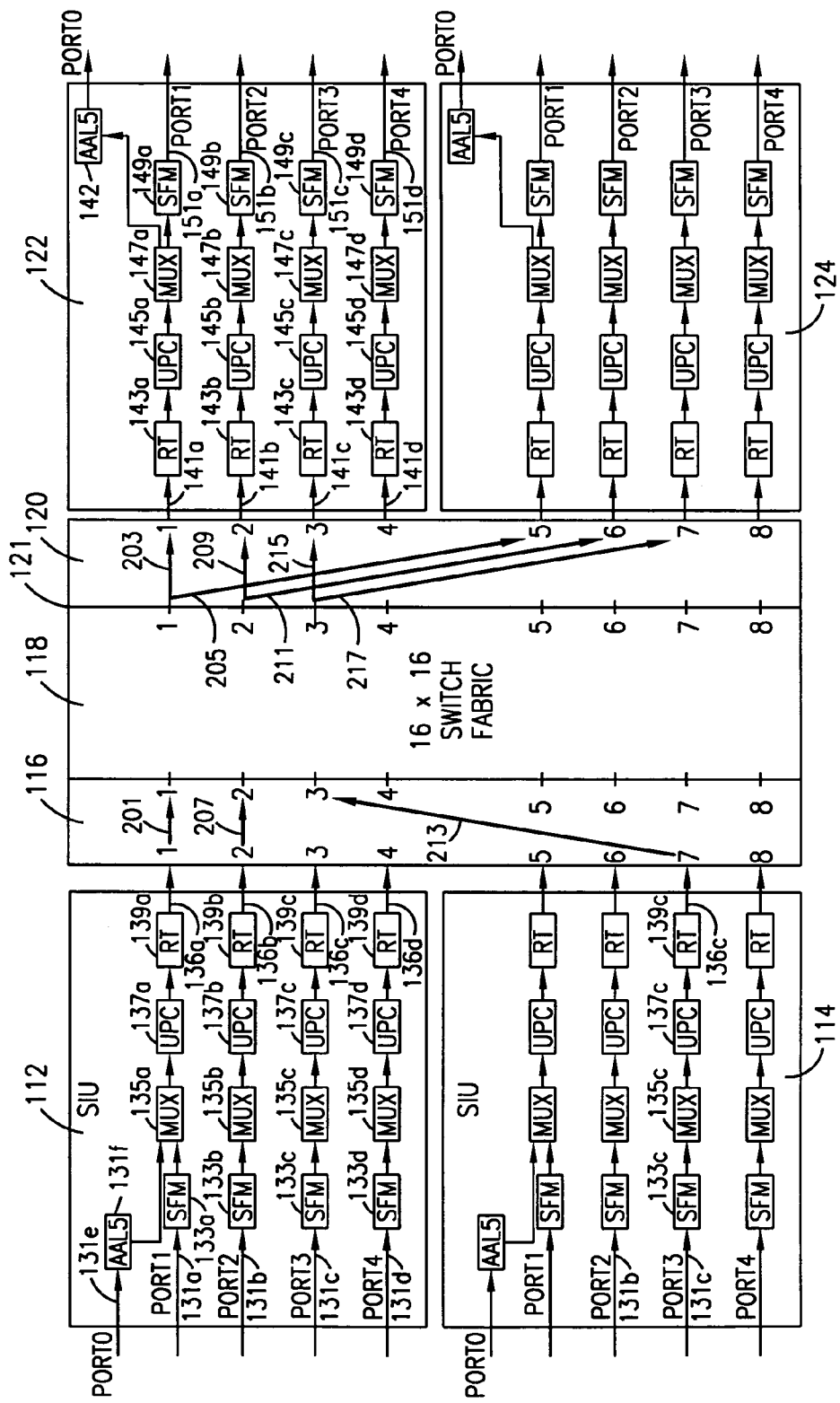
FIG. 5 is an exemplary block diagram illustrating data flow directed by cross point switches according to the present invention.

FIG. 5 illustrates the data flow operation of cross point switches 116 and 120 according to an exemplary embodiment of the present invention. In this particular configuration, ports 1 and 2 of SIU module 112 and port 3 of redundant SIU module 114 are the current working ports. Port 4 is not being used in this example. In fact, it is possible to have port 4 for both SIU 122 and SIU 124 to be operated in an unprotected mode.

The data flows of FIG. 5 will now be explained. First, ATM cell stream 131a received at port 1 of SIU 5 module 112 is processed by the SONET deframer 133a, the MUX 135a, UPC unit 137a, and router 139a and output as ATM cell stream 136a. Cross point switch 116 directs ATM cell stream 136a from input port 1 to output port 1 of cross point switch 116 along path 201 so that the cell stream connects to and is received by port 1 of switch fabric 118.

ATM cell stream 131b is received at port 2 of SIU module 112 and processed by SONET deframer 133b, MUX 135b, UPC unit 137b, and router 139b and output as ATM cell stream 136b. Cross point switch 116 directs ATM cell stream 136b from its input port 2 to its output port 2 along path 207 so that the cell stream connects to and is received by port 2 of switch fabric 118.

ATM cell stream 131c received at port 3 of SIU module 114 are processed by SONET deframer 133c, MUX 135c, UPC unit 137c, and router 139c and output as ATM cell stream 136c. Cross point switch 116 directs ATM cell stream 136c from input port 7 to output port 3 of the cross point switch 116 along path 213 so that the cell stream connects to and is received by input port 3 of switch fabric 118. Thus, the cross point switch 116 connects redundant module 114 output port 7 to input port 3 of switch fabric 118 in substitution for the default path, which when operative, connects port 3 of SIU module 112 to input port 3 of switch fabric 118.

The ATM cell stream 131a is also provided to input port 1 of SIU module 114. If there is an equipment failure in port 1 path in SIU 112, then the communication can be switched and is being processed by port 1 of SIU module 114 and routed via crosspoint switch 116 to input port 1 of the switch fabric 118 without dropping the call. In effect the call is resetup on the fly without interruption to the user. This is an advancement in ATM network switching because the crosspoint switch handles equipment failures without dropping a communication or call.

In essence, an exemplary embodiment of the present invention can detect an equipment failure, such as in an SIU module (the working circuitry) and then protect against the failure by rerouting the ATM cell data from another SIU module's input (the protected circuitry) by disconnecting ATM cell data from a failed, working SIU and connecting a working protection SIU to the switch fabric by using the crosspoint. The crosspoint switch allows the rerouted cell data to be placed back on its original path through the switch fabric. The user does not have his call dropped in the event of the equipment failure. Thus, a more reliable ATM switch network is established.

Switch fabric 118 routes ATM cells received at its input ports 119 to its output ports 121 in accordance with routing instructions. ATM cells destined for output port 1 of switch fabric 118 form ATM cell stream 141a. ATM cells of cell stream 141a composed of ATM cells routed to output port 1 by ATM switch 118 are then directed by cross point switch 120 along path 203 to input port 1 of SIU 122 and concurrently are directed along path 205 to output port 5 of cross point switch 120 which connects directly to port 1 of SIU 124. Consequently, identical ATM streams are transported over paths 203 and 205 by cross point switch 120 to port 1 of SIU modules 122 and 124. Thus, this provides redundant paths to support one-plus-one (1+1) SONET protection switching.

ATM cells destined for output port 2 of switch 15 fabric 118 form ATM cell stream 141b. ATM cells of cell stream 141b composed of ATM cells routed to output port 2 by ATM switch 118 are then directed by cross point switch 120 along path 209 to port 2 of SIU 122 and concurrently are directed along path 211 to output port 6 of cross point switch 120 which connects directly to port 2 of SIU 124. ATM cells destined for output port 3 of switch fabric 118 form ATM cell stream 141c. ATM cells of cell stream 141c composed of ATM cells routed to output port 3 by ATM switch 118 are then directed by cross point switch 120 along path 215 to port 3 of SIU 122 and concurrently are directed along path 217 to port 7 of cross point switch 120 which connects directly to port 3 of SIU 124.

Figure 6:
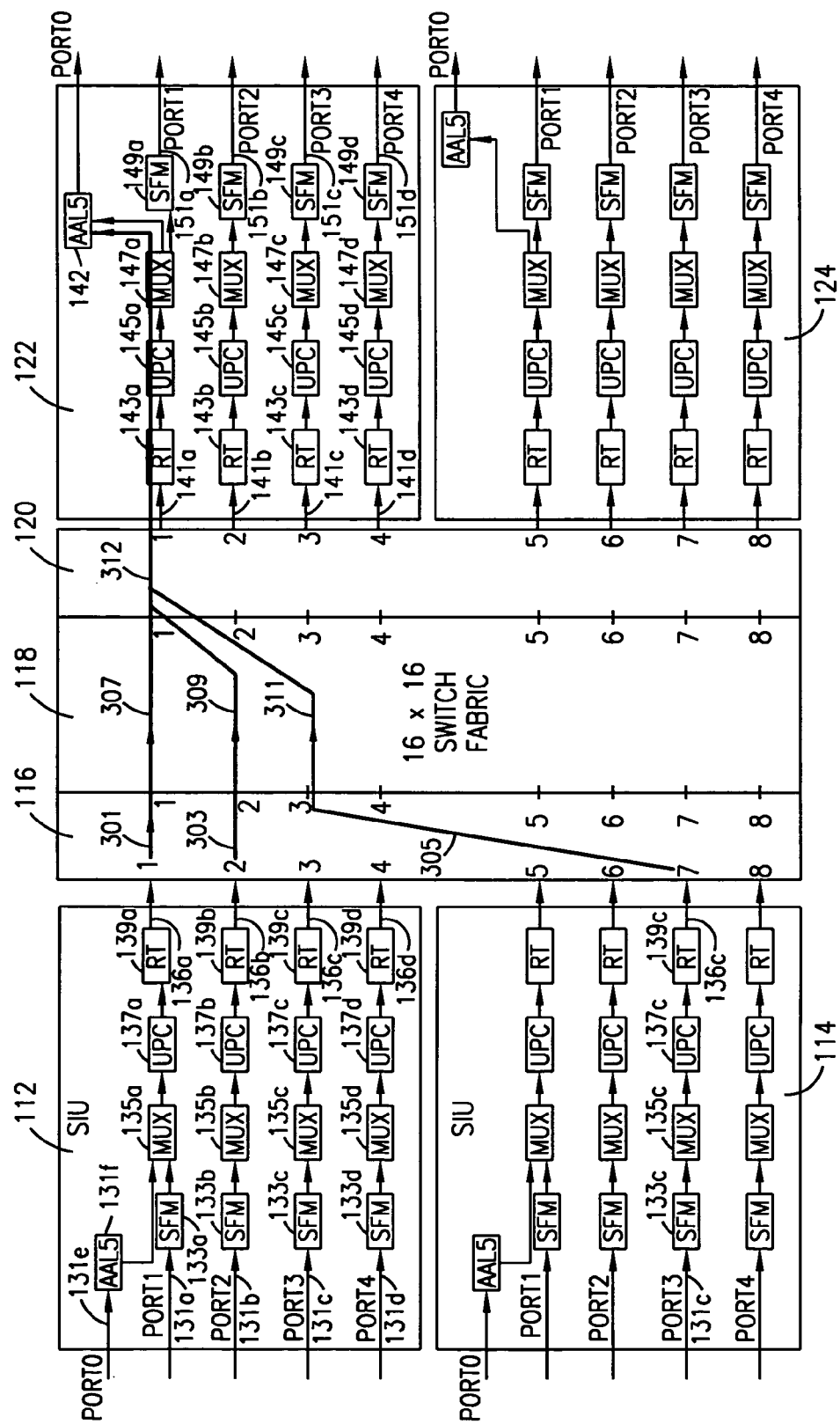
FIG. 6 is an exemplary block diagram illustrating signaling flow directed by cross point switches according to the present invention.

FIG. 6 demonstrates an example of signaling data flow in an exemplary embodiment of the present invention as would appear during a call setup. In this particular configuration, ports 1 and 2 of SIU module 112 and Port 3 of redundant SIU module 114 are the current active 15 ports. Note that Port 4 is not being used in this example.

ATM cell stream 131a received at port 1 of SIU module 112 is processed by SFM 133a, MUX 135a, UPC 137a, and RT 139a and output as ATM cell stream 136a. Cross point switch 116 directs ATM cell stream 136a from its port 1 to its port 1 along path 301 so that the cell stream connects to and is received by port 1 of switch fabric 118.

The ATM cell stream 131b received at port 2 of SIU module 112 is processed by SFM 133b, MUX 135b, UPC 137b, and RT 139b and output as ATM cell stream 136b. Cross point switch 116 directs ATM cell stream 136b from its port 2 to its port 2 along path 303 so that the cell stream connects to and is received by port 2 of switch fabric 118.

The ATM cell stream 131c received at the input port 3 of SIU module 114 is processed by SFM 133c, MUX 135c, UPC 137c, and RT 139c and output as ATM cell stream 136c. Cross point switch 116 directs ATM cell stream 136c from its input port 7 to its output port 3 along path 305 so that the cell stream connects to and is received by input port 3 of switch fabric 118.

The switch fabric 118 routes the ATM signaling cells from paths 301, 303, 305, along paths 307, 309, and 311 to output port 1 on switch fabric 118. Thus, all the call setup information for ports 1, 2 and 3 are being routed to port 1 along path 312 to the signaling unit AAL5 142 of SIU module 122 which processes the calls. Note that it is possible to cause a failure of AAL5 142 on SIU module 122 to use AAL5 142 on SIU module 124.

Although only certain embodiments of the apparatus of the present invention have been illustrated in the accompanying Drawings and described in the foregoing Detailed Description, it will be understood that the invention is not limited to the embodiments disclosed, but is capable of additional rearrangements, modifications and substitutions without departing from the spirit of the invention as set forth and defined by the following claims. Accordingly, it should be understood that the scope of the present invention encompasses all such arrangements and is solely limited by the claims as follows.

What is claimed is:

1. An apparatus providing equipment and facility redundancy, comprising:
    working circuitry configured to receive and process a first stream of communication data;
    protection circuitry configured to receive and process a second stream of communication data, the second stream being identical to the first stream, the protection circuitry and the working circuitry being functionally identical and synchronized to each other;
    an N×N switch fabric having N input ports and N output ports, wherein each of the N input ports may be connected to any one of the N output ports; and
    a first cross point switch having N input ports and N output ports capable of receiving the processed first stream and the processed second stream, wherein the first cross point switch couples the processed first stream to a first input port of the N×N switch fabric in a first configuration and couples the processed second stream to the first input port in place of the processed first stream in a second configuration upon detection of an error condition in at least one of the working circuitry and the first stream of communication data;
    wherein the working circuitry includes a plurality of first ATM channels performing ATM functions on the first stream;
    wherein the protection circuitry includes a plurality of second ATM channels performing the ATM functions on the second stream; and
    wherein one of the first ATM channels and one of the second ATM channels includes the multiplexing, SONET framing, routing, and user parameter control.

2. The apparatus of claim 1, wherein the communication data is ATM cells data.

3. The apparatus of claim 1, wherein the working circuitry receives the first stream from an optical signal and the protection circuitry receives the second stream from the optical signal.

4. The apparatus of claim 1, wherein the working circuitry is implemented on a first circuit board and the protection circuitry is implemented on a second circuit board, the first circuit board being separate and distinct from the second circuit board.

5. The apparatus of claim 1, wherein one of the first ATM channels and one of the second ATM channels each includes a multiplexer.

6. The apparatus of claim 1, wherein one of the first ATM channels and one of the second ATM channels includes a router.

7. The apparatus of claim 1, wherein one of the first ATM channels and one of the second ATM channels includes a user parameter control unit.

8. The apparatus of claim 1, further comprising:
    a first module including the working circuitry accepts the first stream as input to the working circuitry.

9. The apparatus of claim 1, further comprising:
    a second module including the protection circuitry and having a plurality of ports wherein one of the ports accepts the second stream as input into the protection circuitry.

10. The apparatus of claim 1, further comprising a second cross point switch having N input ports and N output ports capable of receiving the processed first stream or the processed second stream from a first output port of the N×N switch fabric, wherein the second cross point switch couples the first output port of the N×N switch fabric to at least one of an output portion of a second working circuitry and an output portion of a second protection circuitry.

11. The apparatus of claim 1, wherein the error condition is a facility error condition.

12. The apparatus of claim 10, wherein the facility error condition includes a disconnected cable.

13. The apparatus of claim 1, wherein the error condition is an equipment error condition.

14. The apparatus of claim 12, wherein the equipment error condition includes at least one of a failure of a SONET Framer a failure of a multiplexer, a failure of a parameter control unit, and a failure of a router.

15. A method providing equipment and facility redundancy for ATM circuitry which carriers out ATM functions, comprising:
performing a group of ATM functions with first circuitry on a first stream of ATM cells producing a processed first stream;
performing the ATM functions with second circuitry on a second stream of ATM cells producing a processed second stream, the second stream being identical to the first stream, the first circuitry and the second circuitry implementing the ATM functions, the first circuitry and the second circuitry being synchronized to each other; and
in a cross point switch having N input ports capable of receiving the first processed stream and the second processed stream and N output ports coupled to N input ports of an N×N switch fabric, coupling the first processed stream to a first input port of the N×N switch fabric in a first configuration and coupling the second processed stream to the first input port of the N×N switch fabric in place of the first processed stream in a second configuration upon detection of an error condition in the first circuitry, thereby providing redundancy protection for the ATM functions;
wherein the ATM functions include the multiplexing, SONET framing, routing, and user parameter control.

16. A redundant telecommunication switch comprising:
a primary input interface comprising N communication paths capable of receiving N input data streams and outputting N processed data streams;
a secondary input interface comprising N communication paths capable of receiving copies of said N input data streams and outputting N copy data streams corresponding to the N processed data streams output from the primary input interface, wherein the secondary input interface is functionally identical to the primary input interface;
a switch fabric having 2N input ports and 2N output ports, wherein each of the 2N input ports may be connected to each one of the 2N output ports; and
a first cross point switch having first N input ports capable of receiving the N processed data streams from the primary input interface and second N input ports capable of receiving the N copy data streams from the secondary input interface, wherein the first cross point switch couples the N processed data streams from the primary input interface to N inputs ports of the switch fabric in a first configuration, and wherein the first cross point switch is capable of detecting an error in a first processed data stream output from the primary input interface and, in response to the detection, switching a corresponding first copy data stream to a first input port of the switch fabric in place of the first processed data stream in which the error was detected;
wherein the primary input interface includes a plurality of first ATM channels performing ATM functions on the input data streams and the secondary input interface includes a plurality of second ATM channels performing the ATM functions on the copies of the input data streams; and
wherein one of the first ATM channels and one of the second ATM channels includes the multiplexing, SONET framing, routing, and user parameter control.

* * * * *

UNITED STATES PATENT AND TRADEMARK OFFICE
CERTIFICATE OF CORRECTION

| | | |
|---|---|---|
| PATENT NO. | : 7,065,037 B1 | |
| APPLICATION NO. | : 09/276346 | |
| DATED | : June 20, 2006 | |
| INVENTOR(S) | : Senthil K. Viswanathan and Robert W. Cubbage | |

It is certified that error appears in the above-identified patent and that said Letters Patent is hereby corrected as shown below:

Column 6, line 13, delete "5" after the term "SIU".

Signed and Sealed this

Fifth Day of December, 2006

JON W. DUDAS
*Director of the United States Patent and Trademark Office*